*INVENTOR*
WALTHER GUSTAV GROT

United States Patent Office 3,702,267
Patented Nov. 7, 1972

3,702,267
ELECTROCHEMICAL CELL CONTAINING A WATER-WETTABLE POLYTETRAFLUORO-ETHYLENE SEPARATOR
Walter Gustav Grot, Chadds Ford, Pa., assignor to E. I. du Pont de Nemours and Company, Wilmington, Del.
Filed June 15, 1970, Ser. No. 46,289
Int. Cl. H01m 3/02
U.S. Cl. 136—146     5 Claims

ABSTRACT OF THE DISCLOSURE

Polytetrafluoroethylene is provided containing from 20 to 95% by weight of inorganic particulate solids which are characterized by a particle diameter of no greater than 0.2 micron, a bulk density no greater than of 0.25 gm./cm.$^3$, and a specific surface area of at least 20 m.$^2$/gm. The particulate solids impart a high degree of microporosity and wettability which makes the polymer useful as a filter or as an ion permeable separator in electrochemical cells.

---

This invention relates to water-wettable polytetrafluoroethylene and to electrochemical cells containing the polymer as the membrane separating the electrode compartments from one another.

Polytetrafluoroethylene has the thermal and chemical inertness even at elevated temperatures that would make this polymer ideally suited for use in the corrosive environment of electrochemical cells, except that the polymer is not water-wettable and hence is not wet by aqueous electrolytes. This lack of wettability prevents the polymer from being used as the porous separator in electro chemical cells and has led to the use of less chemically and thermally stable polymers in this application which give less than optimum results.

The present invention provides a polytetrafluoroethylene composition which is water-wettable, thereby making the polymer useful as the porous separator in electrochemical cells such as batteries and fuel cells. The composition is a blend of polytetrafluoroethylene with from 20 to 95% by weight, based on the total weight of the blend of inorganic, finely divided, high surface area particulate solids. More specifically, the particulate solids have a particle diameter of no greater than 0.2 micron, a bulk density of no greater than 0.25 gm./cm.$^3$, and a specific surface area of at least 20 m.$^2$/g. These particular solids impart a high degree of porosity to the blend.

Figure 2:
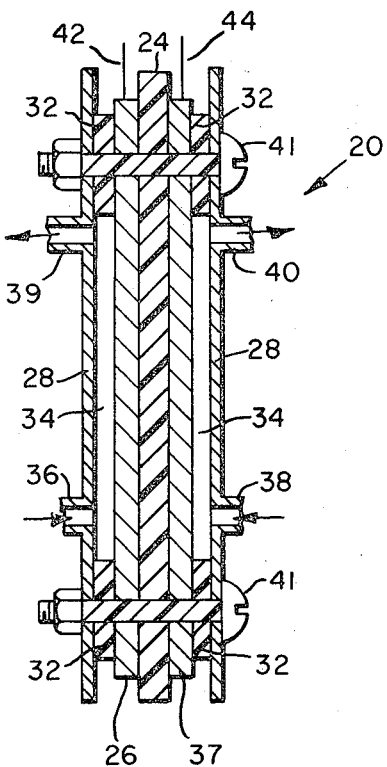
Figure 1:
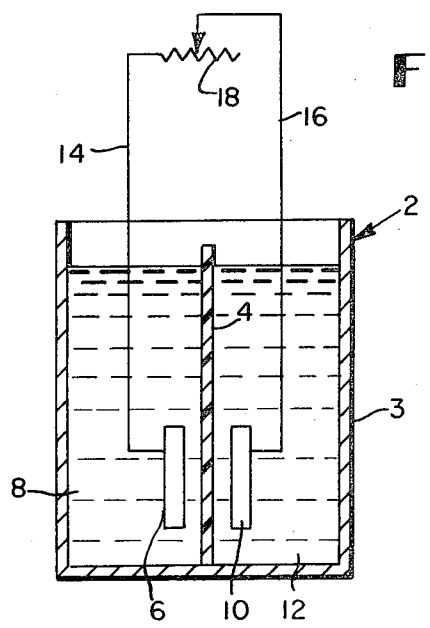

The invention will be described in more detail hereinafter with reference to the accompanying drawing in which:

FIG. 1 is a schematic side elevation cross-sectional view of an eelctrochemical cell containing a porous separator made from the polymer composition of the present invention; and FIG. 2 is a schematic side elevation of a fuel cell containing a porous separator made from the polymer composition of the present invention.

In FIG. 1 a battery 2 is shown consisting of a container 3 within which is housed a porous separator 4 which divides the container 2 into two compartments. On one side of separator 4 is an anode 6 immersed in an aqueous anolyte 8, and on the opposite side is cathode 10 immersed in catholyte 12, the anolyte and catholyte being the same electrolyte. Leads 14 and 16 connect the electrodes 6 and 10, respectively, to an electric resistance 18 external of the battery. Preferably, the compartments of the battery are electrochemically regenerable, whereby the battery is a secondary battery. In operation, the cathode and catholyte interact to form ions which pass through the separator to the anode where ionic current is converted to electronic current. The separator 4 while serving the function of being ion permeable, also prevents contact between electrodes which would short-out the battery.

The fuel cell 20 of FIG. 2 also comprises a porous separator 24 sandwiched between the anode and cathode compartments of the fuel cell. In the anode compartment, the anode 26 is positioned against the separator, and a plate enclosure 28 is spaced from the anode by spacers 32 to form an enclosed fuel space 34. The plate enclosure is provided with an inlet 36 and an outlet 39 for gaseous fuel. The cathode 37, spacers 32, plate enclosure 28, and gaseous oxidant space 34 of the cathode compartment are similarly arranged with the plate enclosure for this compartment being provided with an inlet 38 and outlet 40 for oxidant. Each electrode is porous to permit access of the gaseous reactant to its respective side of the separator 24. The entire assembly is fastened together by nut-bolt combinations 41, the bolts being non-conductive and extending through the separator, electrodes, spacers and plate enclosures as shown. Leads 42 and 44 connect the anode and cathode to an external resistance. In the embodiment shown, gaseous fuel and oxidant are fed to the electrode compartments via inlets 36 and 38, respectively. By the catalytic action of the respective electrodes on these feeds, ions formed at the cathode flow through separator 20 which is saturated with liquid electrolyte to be converted to electronic current at the anode. Besides functioning as an ion permeable separator between the electrodes in the fuel cell, the separator also separates the reactants from one another which is particularly necessary because the gaseous feeds are different reactive gases, e.g. $H_2$ to the anode and $O_2$ to the cathode, or where one of the feeds is a liquid and the other is gaseous.

Further details on the construction and operation of electrochemical cells with which separators of the present invention can be used are disclosed in British patent publication No. 1,184,321.

The separators 4 and 24 of the foregoing described electrochemical cells are made of a polytetrafluoroethylene-particulate solid blend hereinbefore described, the blend being in sheeting form.

The polytetrafluoroethylene component of the blend is a well known article of commerce. The polymer is made by the aqueous dispersion polymerization method such as described in U.S. Pat. No. 2,559,752 to Berry, U.S. Pat. No. 2,612,484 to Bankoff, and U.S. Pat. No. 3,037,-953 to Marks et al. The polymer can also be modified as described in U.S. Pat. No. 3,142,655 to Cardinal et al. The polymer can also be referred to as polytetrafluoroethylene fine powder.

The particulate-solid component of the composition is finely divided, as evidenced by its particle size being no greater than 0.2 micron in diameter. The particulate solid is also extremely light and of high surface area as evidenced by the bulk density being no greater than 0.25 gm./cm.$^3$ and the specific surface area being at least 20 m.$^2$/gm. The bulk density is the quotient of weight divided by bulk volume. The specific surface area is the internal and external surface area of the particles, which can be measured by nitrogen absorption by the BET method. The high specific surface area of the particles denotes a high degree of internal open structure, viz. voids and capillaries, within the particles and a generally fibrous structure which imparts a high degree of micro-porosity to the polymer. The fibers may be longer than 0.2 micron, but their average diameter should be no greater than that dimension. The voids and capillaries of the particles take up water and when the particles are incorporated into polytetrafluoroethylene, they give the polymer the appearance and character of being water wettable and impart porosity to the polymer. By "incorporated" is meant the particles of the particulate solid component are uniformly dispersed throughout the polytetrafluoroetehylene component, the resultant composition being referred to herein as a "blend."

Generally, the particulate solid component is inorganic and water insoluble. Specific particulate solids are the oxides of the metals Al, Si or Ti. These solids can be obtained in the form of finely divided, light-weight high surface area particles as described above by the fuming process in which the volatile chloride of the metal is reacted with water at high temperatures such as 1100° C. to form the oxide. An example of the reaction is as follows:

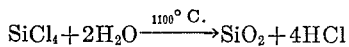

$$SiCl_4 + 2H_2O \xrightarrow{1100°\ C.} SiO_2 + 4HCl$$

The particulate solid can be incorporated into the polytetrafluoroethylene by conventional blending techniques. For example, the polytetrafluoroethylene at the time of blending can be in the form of a dispersion in its original aqueous dispersion polymerization medium and the particulate solids are added thereto in the form of a suspension or emulsion in a liquid which is miscible with the water of the polymerization system, followed by mixing, coagulation, drying and fabrication of the resultant blend into the shape desired, e.g. tubes, sheets and rods. Details of a procedure for combining the components and forming the blend into sheeting are disclosed in U.S. Pat. No. 3,496,102 to Dahl et al. In summary, this procedure is to coagulate the aqueous dispersion of polytetrafluoroethylene which contains the liquid medium-added particulate solids, expressing excess liquid from the resultant coagulum to obtain a doughy mass, rolling the doughly mass to reduce its thickness and obtain sheeting, and drying the resultant sheeting. Preferably, the rolling step is carried out primarily using the series of rolling, folding, and rolling operations described in Canadian patents, Nos. 725,704 and 681,132, both to Roberts, in which rolling following folding of the sheet is transverse to the rolling prior to folding, to produce biaxially strong sheeting. Typically, the final thickness of the resultant sheeting, depending on its intended use, will be from 0.01 to 0.1 cm. thick.

This rolling procedure tends to fibrillate the polytetrafluoroethylene, enabling as little as 5 percent polymer to bind 95 percent particulate solids together. The lower limit of particulate solids present in the blend will depend on the properties desired in the intended use of the blend and on the particular particulate solids used. For example, the higher their specific surface area, the smaller the proportion needed for a given amount of water take-up and porosity in the blend. Thus, particulate solids having specific surface areas of at least 30 m.$^2$/gm. are preferred, and even more preferably, at least 75 m.$^2$/gm. Similarly, particle sizes of no greater than 0.1 micron in diameter are preferred, and bulk densities no greater than 0.1 gm./cm.$^3$ are preferred. Typically, at least 20% by weight of particulate solids will be required to obtain substantially complete internal wetting of the blend starting with the blend in the dry state (this is what is meant by the expression "water wettability" used herein); this wetting is visually observable by the blend turning substantially transparent where contacted with water, from an original opaque-to-translucent appearance. The preferred blend composition is 30 to 80 percent by weight particulate solid based on the total weight of the blend.

It is desired that the blend of this invention have a porosity of at least 50 percent as determined by 100 times the weight gain of the blend when immersed in water to equilibrium divided by the dry weight of the blend (excess water is wiped from surface of the polymer). Normally the particulate solids in the blend will impart this degree of porosity to the blend, but the porosity of the blend is augmented by the rolling procedure hereinbefore described and can be further augmented by the incorporation of leachable filler of similar particle size to the particulate solids into the blend, followed by leaching the filler therefrom.

The micropores within the blend made the blend useful for ultra filtration in addition to the electrochemical cell application hereinbefore described.

Specific examples of the present invention are as follows (parts and percents are by weight unless otherwise indicated):

EXAMPLE 1

Into an Osterizer blender containing 150 g. of a 1:1 mixture of ethanol and water and 20 g. of a dispersion of polytetrafluoroethylene as polymerized in a dispersion polymerization system, the dispersion being 33 percent solids, was added 20 g. of fumed SiO$_2$ having an average particle diameter of 0.012 micron, specific surface area of 200 m.$^2$/gm., and bulk density of 0.046 gm./cm.$^3$. The resultant mixture was blended to mix the SiO$_2$ with the polymer and coagulate the latter. The resulting paste-like material was dried to approximately 50 g. and rolled with repeated folding and turning 90°, starting with a thickness of 0.13 cm., to a final thickness after 10 cycles of folding and rolling of 0.02 cm., and porosity of 65 percent. The resultant sheeting has a hazy appearance and the water-wettability of the sheeting was demonstrated by it turning transparent where contacted with water.

When this experiment was repeated using sheeting made by the foregoing process except for omitting the fumed SiO$_2$, the resultant sheeting was non-porous and not water wettable.

Repeat of this experiment but using fumed SiO$_2$ having an average particle diameter of 0.1 micron, specific surface area of 25 m.$^2$/gm., and bulk density of 0.2 gm./cm.$^3$, gave sheeting of only 41 percent porosity and which where contacted with water did not turn completely transparent (had a slight haze) indicating a lack of complete wetting of the pores of the sheeting. The purpose of this experiment is to show how the water wettability diminishes when the particulate solid is increased and the specific surface area reduced. The sheeting of this experiment is useful as a separator in an electrochemical cell but better results are obtained where complete wetting is attained such as for the sheeting of the first paragraph of this example.

EXAMPLE 2

To an Osterizer blender was added 20 g. of fumed TiO$_2$ having an average diameter of 0.04 micron, specific surface area of 45 m.$^2$/gm. and bulk density of 0.06 gm./cm.$^3$, and 150 gm. of water and blended. To the resultant dispersion was added 12 g. of the polytetrafluoroethylene dispersion described in Example 1. The blended, coagulated mixture was filtered, dried and re-wetted with Stoddard solvent to serve as a lubricant in the rolling and folding procedure which was the same as described in Example 1. The resultant sheeting was 0.043 cm. thick and had a porosity of 62 percent. This sheeting was water wettable as indicated by its hazy appearance when dry turning transparent where contacted with water.

Substantially the same result is obtained when this experiment is repeated using fumed Al$_2$O$_3$ in place of the TiO$_2$, with the Al$_2$O$_3$ having a particle size of 0.03 micron, a specific surface area of 80 m.$^2$/gm. and a bulk density of 0.06 gm./cm.$^3$.

EXAMPLE 3

A fuel cell resembling that of FIG. 2 was made using the sheeting described in the first paragraph of Example 1. The sheeting was saturated with an aqueous solution which was 85 percent phosphonic acid and sandwiched between two platinum-containing electrodes (American Cyanamid AA2). Oxygen and hydrogen were fed to the cathode and anode compartments, respectively. The cell is heated to 150° C. and an output of 0.7 volt at a current of 18.6 amps/m.$^2$ was obtained. Similar results using the fumed TiO$_2$ and fumed Al$_2$O$_3$ sheeting of Example 2 is obtained. When the sheeting contains silica gel instead of fumed SiO$_2$ more according to the procedure of the first paragraph of Example 1, the output of the cell drops to zero at currents of more than 0.9 amp/m.$^2$.

To illustrate the importance of particle size, bulk density, and specific surface area of the particulate solid component of blends of this invention, 50 gm. of silica gel (Fisher grade 12, 28–200 mesh), which is much denser (bulk density of .755 gm./cm.$^3$) and lower in specific surface area than fumed SiO$_2$, were mixed in a beaker with 45 ml. of the polytetrafluoroethylene dispersion of Example 1 and 25 ml. of water. The resulting coagulum was rolled into a sheet according to the procedure of Example 1, and the resultant sheeting was wettable by acetone but not by water. The same lack of water wettability is obtained when the silica gel was replaced by 50 gm. of silicic acid (Mallinkrodt Silic AR, CC-7, 200–325 mesh) which has a bulk density of 0.43 gm./cm.$^3$.

As many apparently widely different embodiments of this invention may be made without departing from the spirit and scope thereof, it is to be understood that this invention is not limited to the specific embodiments thereof except as defined in the appended claims.

I claim:

1. In an electrochemical cell in which the anode and cathode compartments are separated from one another by an ion-permeable sheeting, the improvement comprising said sheeting being the blend of polytetrafluoroethylene with from 20 to 95% by weight based on the total weight of the blend of inorganic particulate solid which is a fumed oxide of Al, Si, or Ti having an average particle diameter of no greater than 0.2 micron, a specific surface area of at least 20 m.$^2$/gm., and a bulk density of no greater than 0.25 gm./cm.$^3$.

2. The electrochemical cell of claim 1 wherein the particulate solid is TiO$_2$.

3. The electrochemical cell of claim 1 wherein the sheeting has a porosity of at least 50 percent.

4. The electrochemical cell of claim 1 wherein the particulate solid is fumed silica having a specific surface area of at least 75 m.$^2$/gm.

5. The electrochemical cell of claim 1 wherein said particulate solid has a specific surface area of at least 75 m.$^2$/gm., an average particle diameter of no greater than 0.1 micron, and a bulk density of no greater than 0.1 gm./cm.$^3$.

References Cited
UNITED STATES PATENTS

| | | | |
|---|---|---|---|
| 3,496,102 | 2/1970 | Dahl et al. | 210—31 |
| 3,556,161 | 1/1971 | Roberts | 260—2.5 |
| 3,407,249 | 10/1968 | Landi | 264—49 |
| 3,453,149 | 7/1969 | Adlhart et al. | 136—153 |
| 3,542,596 | 11/1970 | Arrance | 136—146 |
| 3,607,832 | 9/1971 | Hansen | 260—37 SB |
| 3,615,791 | 10/1971 | Thomas et al. | 260—37 SB |

DONALD L. WALTON, Primary Examiner

U.S. Cl. X.R.

204—295; 260—2.5 M; 264—47